United States Patent [19]
Williams

[11] Patent Number: 6,052,568
[45] Date of Patent: Apr. 18, 2000

[54] APPARATUS AND METHOD FOR EFFICIENTLY IMPLEMENTING A SATELLITE TRANSCEIVER SYSTEM

[75] Inventor: Anthony David Williams, Aptos, Calif.

[73] Assignee: Celeritek, Santa Clara, Calif.

[21] Appl. No.: 09/138,851

[22] Filed: Aug. 24, 1998

[51] Int. Cl.[7] .................................................. H04B 1/04
[52] U.S. Cl. ........................ 455/126; 455/12.1; 455/127
[58] Field of Search ............................... 455/75, 84, 86, 455/12.1, 13.1, 115, 126, 127, 427, 430, 550; 375/220, 221, 279, 281; 332/100, 103, 107, 123, 144, 159, 162

[56] References Cited

U.S. PATENT DOCUMENTS

| | | | |
|---|---|---|---|
| 4,707,699 | 11/1987 | Toellner et al. | 342/352 |
| 5,251,232 | 10/1993 | Nonami | 455/84 |
| 5,351,016 | 9/1994 | Dent | 332/103 |
| 5,423,082 | 6/1995 | Cygan et al. | 455/126 |
| 5,574,994 | 11/1996 | Huang et al. | 455/126 |
| 5,732,330 | 3/1998 | Anderson et al. | 455/86 |
| 5,894,496 | 4/1999 | Jones | 455/126 |
| 5,898,906 | 4/1999 | Williams | 455/75 |
| 5,913,154 | 6/1999 | Wynn | 455/127 |

*Primary Examiner*—Dwayne D. Bost
*Assistant Examiner*—Nay Maung
*Attorney, Agent, or Firm*—Carr & Ferrell LLP; Gregory J. Koerner

[57] ABSTRACT

An apparatus and method for efficiently implementing a satellite transceiver system comprises a digital signal processor for providing input signals to a transmitter, a vector modulator for generating a modulated signal from the input signals, and an output amplifier for amplifying the modulated signal to produce a transmit signal. The invention also includes an attenuator that samples the transmit signal to generate an error signal, a mixer that downconverts the error signal to produce a downconverted error signal, a feedback vector demodulator that demodulates the downconverted error signal to generate result signals that contain error information pertaining to the transmit signal. The digital signal processor may then compare the result signals with the input signals to responsively alter the input signals, and thereby correct for distortion in the transmit signal.

14 Claims, 8 Drawing Sheets

APPARATUS AND METHOD FOR EFFICIENTLY IMPLEMENTING A SATELLITE TRANSCEIVER SYSTEM

CROSS-REFERENCE TO RELATED APPLICATIONS

This application is related to U.S. patent application Ser. No. 08/660,750, entitled "System And Method For Generating Frequencies In Cellular Radio Transceivers," filed on Jun. 6, 1996, and is also related to U.S. patent application Ser. No. 08/738,607, entitled "System And Method For Implementing A Cellular Radio Transmitter Device," filed on Oct. 29, 1996. The subject matter of each of these related patent applications is incorporated herein by reference.

BACKGROUND OF THE INVENTION

1. Field of the Invention

This invention relates generally to electronic telecommunication systems, and relates more particularly to an apparatus and method for efficiently implementing a satellite transceiver system.

2. Description of the Background Art

An efficient and cost-effective implementation is generally a significant consideration for manufacturers, designers, and users of modern telecommunication systems. A telecommunication system that successfully combines both efficiency and cost-effectiveness may therefore advantageously provide substantial economic benefits and achieve effective functionality.

Referring now to FIG. 1, a diagram for an installation of a conventional satellite transceiver system is shown. The installation of FIG. 1 includes a shelter 110, an antenna 112, an outdoor unit (ODU) 114, an indoor unit (IDU) 116, and a user interface 118. The FIG. 1 system is preferably designed for use as a Single Subscriber Satellite Communications Terminal that may typically be used for various telecommunication applications, such as rural telephony.

In operation, a user may enter shelter 110 and utilize user interface 118 to communicate with other subscribers of the telecommunication system. User interface 118 typically includes a user headset and a keypad to allow a system user to access the telecommunication system. IDU 116 may include a modem, a coder/decoder, power supplies, and control circuitry. ODU 114 typically includes an up-converter, a power amplifier, a down-converter, and a multiplexer. Therefore, a user may access the FIG. 1 system via user interface 118, IDU 116, ODU 114, and antenna 112 to either transmit or receive selected information. In practice, the FIG. 1 system exhibits reduced efficiency and cost-effectiveness because the ODU 114 and the IDU 116 are divided into two separate installation locations.

Referring now to FIG. 2, a drawing of a Cartesian graph showing values for an offset quaternary phase shift keying (OQPSK) modulation scheme is shown. In contemporary telecommunications, selected information to be transmitted to a satellite may be imposed onto a microwave carrier using various efficient modulation schemes including OQPSK.

In a Cartesian graph having Cartesian coordinates, any point on an analog waveform may be represented by X and Y coordinates. In Cartesian symbology, the X coordinate is called I, and the Y coordinate is called Q. In the FIG. 2 graph depicting an OQPSK modulation scheme, different values for I and Q may thus be combined to represent two bits of digital data. For example, a binary value of 00 may be represented by vector 216 and coordinates 218. Similarly, coordinates 222 correspond to a binary value of 01, coordinates 226 correspond to a binary value of 10, and coordinates 230 correspond to a binary value of 11.

As illustrated in FIG. 2 by dotted lines 220, 224, and 228, whenever the two-bit binary values change, the corresponding vector 216 must vary its amplitude to directly traverse to a new set of coordinates. Any distortion or error in the amplitude of vector 216 may introduce potential error in the binary values corresponding to the related coordinates. For the foregoing reasons, contemporary advanced modulation schemes like OQPSK require the use of highly linear power output amplifiers in the transmitter section of a satellite transceiver to avoid distortion in the transmitted data signal and corresponding loss of transmitted data.

The requirement for highly linear power amplifiers conventionally predicates the use of very high performance power amplifiers operating at high current levels. This mode of operation results in significant reduction of costeffectiveness in the overall system functionality. The foregoing problems are compounded because satellite transceivers typically function at higher operating frequencies which place greater demands and constraints on the overall transceiver system design. Therefore, for all the foregoing reasons, an improved apparatus and method are needed for efficiently implementing a satellite transceiver system.

SUMMARY OF THE INVENTION

In accordance with the present invention, an apparatus and method are disclosed for efficiently implementing a satellite transceiver system. The invention includes a digital signal processor that provides input signals to a transceiver. In the preferred embodiment, the input signals include an I demand signal and a Q demand signal for an advanced modulation scheme such as offset quaternary phase shift keying (OQPSK).

A vector modulator then receives the input signals and responsively generates a modulated signal from the received I demand signal and Q demand signal. Next, an output amplifier receives and amplifies the modulated signal to generate a transmit signal that is then broadcast using an antenna.

To correct for distortion in the transmit signal (created by various factors such as nonlinearity in the output amplifier), an attenuator samples and attenuates the transmit signal to generate an error signal. Then, a feedback mixer receives and advantageously downconverts the error signal to produce a downconverted error signal.

Next, a feedback vector demodulator demodulates the downconverted error signal to generate result signals. In the preferred embodiment, the result signals include an I result signal and a Q result signal that contain error information from the transmit signal sampled from the output amplifier.

The digital signal processor then compares the input signals (I demand and Q demand) and the result signals (I result and Q result) to generate correction signals. Finally, the digital signal processor applies the generated correction signals to the input signals (I demand and Q demand) to alter and precondition the input signals, and to thereby compensate for distortion in the transmit signal sampled from the output amplifier. The present invention thus efficiently implements a cost-effective satellite transceiver system.

DETAILED DESCRIPTION OF THE PREFERRED EMBODIMENT

The present invention relates to an improvement in electronic telecommunciation systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention includes an apparatus and method for efficiently implementing a satellite transceiver system. The invention comprises a digital signal processor for providing input signals to a transmitter, a vector modulator for generating a modulated signal from the input signals, and an output amplifier for amplifying the modulated signal to produce a transmit signal. The invention also includes an attenuator that samples the transmit signal to generate an error signal, a mixer that downconverts the error signal to produce a downconverted error signal, a feedback vector demodulator that demodulates the downconverted error signal to generate result signals that contain error information correlating to the transmit signal. The digital signal processor may then compare the result signals with the input signals to responsively alter the input signals, and thereby correct for distortion in the transmit signal.

Figure 3:
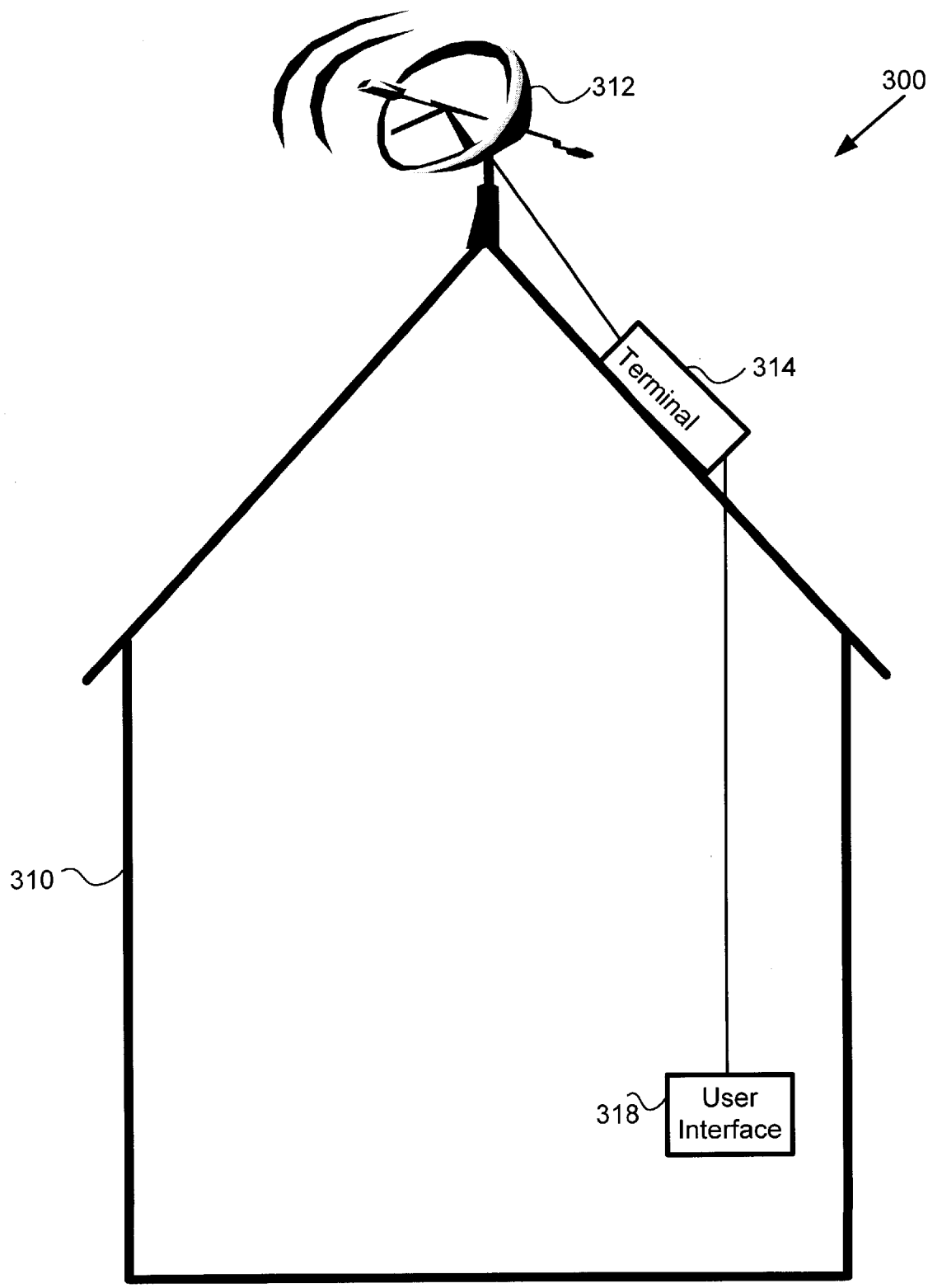
FIG. 3 is a diagram illustrating one embodiment for an installation of a satellite transceiver system, in accordance with the present invention.

Referring now to FIG. 3, a diagram illustrating one embodiment for an installation 300 of a satellite transceiver system is shown, in accordance with the present invention. The installation 300 of FIG. 3 includes a shelter 310, an antenna 312, a terminal 314, and a user interface 318. The FIG. 3 system is preferably designed for use as a Single Subscriber Satellite Communications Terminal that may typically be used for various telecommunication applications, such as rural telephony. For example, the FIG. 3 system may economically be shared by a rural village in an undeveloped area to send and receive telephone communications in the absence of an extensive and expensive local landline infrastructure.

In operation, a user utilizes user interface 118 to communicate with other subscribers of a telecommunication system. User interface 118 typically includes a user headset and a keypad to allow the system user to access the telecommunication system. Terminal 314 includes a transceiver device that advantageously incorporates the functions of ODU 114 and IDU 116 of FIG. 1. The transceiver device is further discussed below in conjunction with FIGS. 4 through 8.

Figure 1:
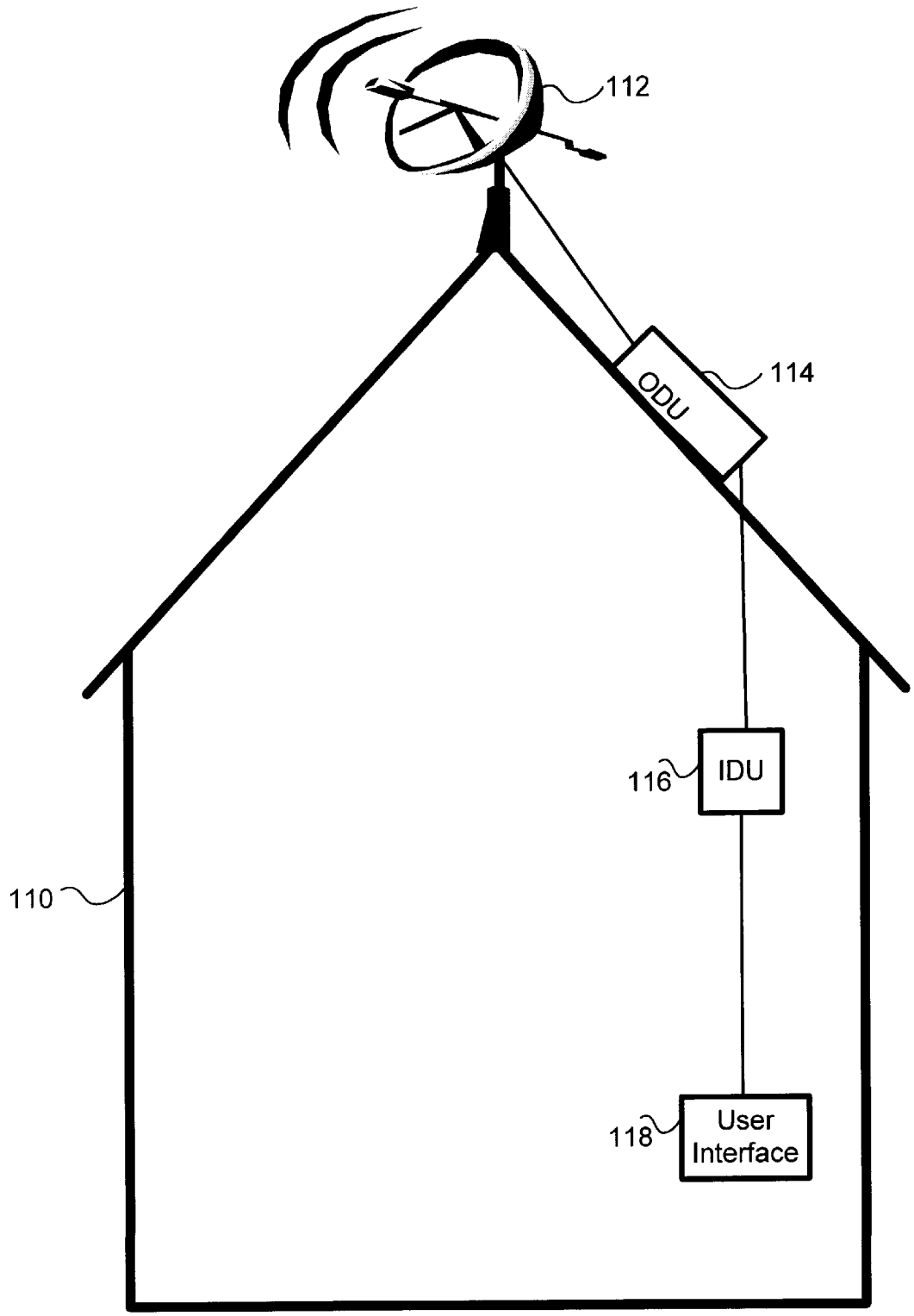
FIG. 1 is a diagram illustrating an installation of a conventional satellite transceiver system.
Figure 2:
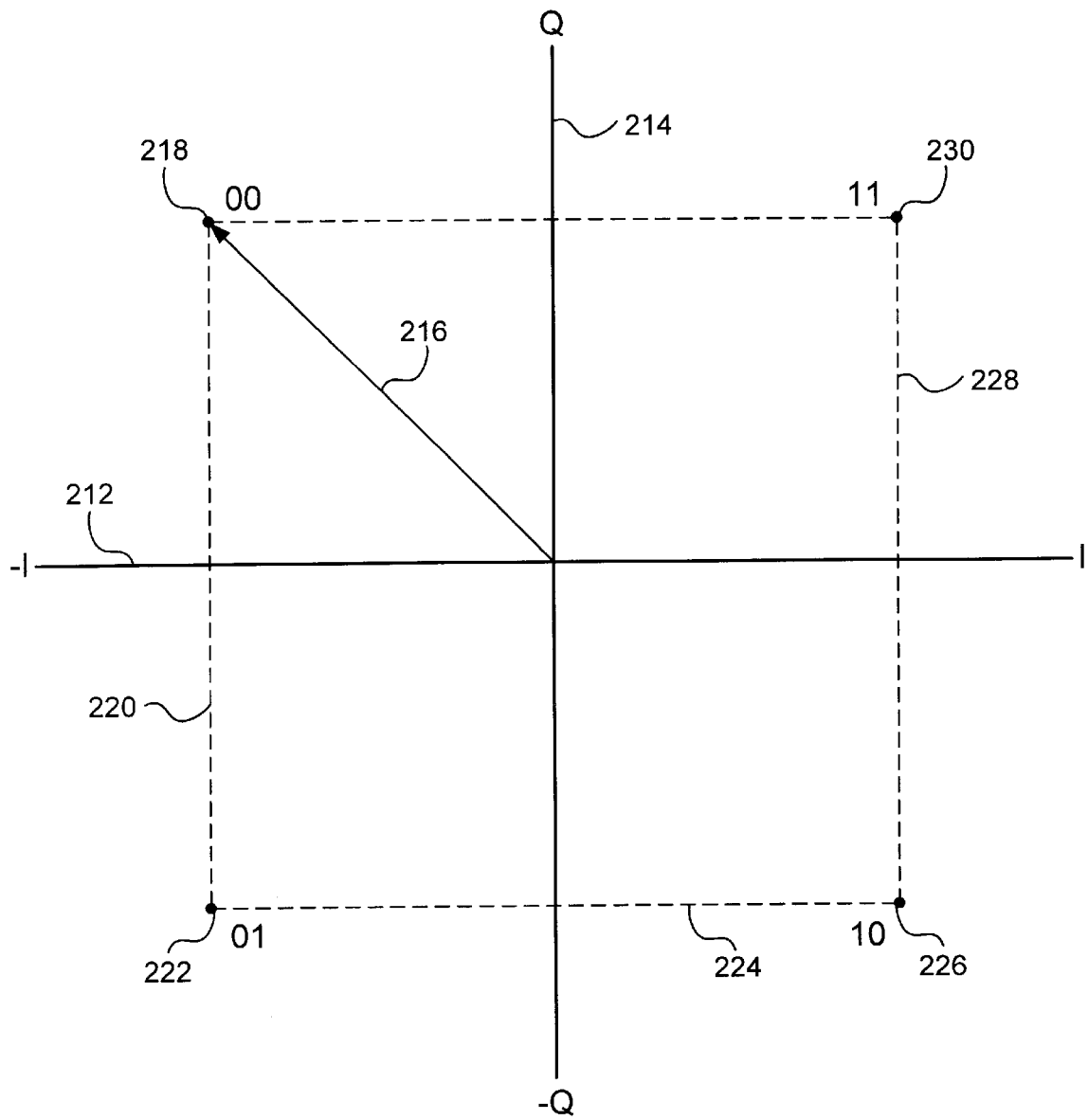
FIG. 2 is a drawing of a Cartesian graph showing values for an offset quaternary phase shift keying modulation scheme.

A user may therefore access the telecommunication system via user interface 318, terminal 314, and antenna 312 to either transmit or receive selected information. In practice, the FIG. 3 system exhibits increased efficiency and cost-effectiveness because the traditional ODU 114 and the IDU 116 of FIG. 1 are economically combined into a single installation location.

Figure 4:
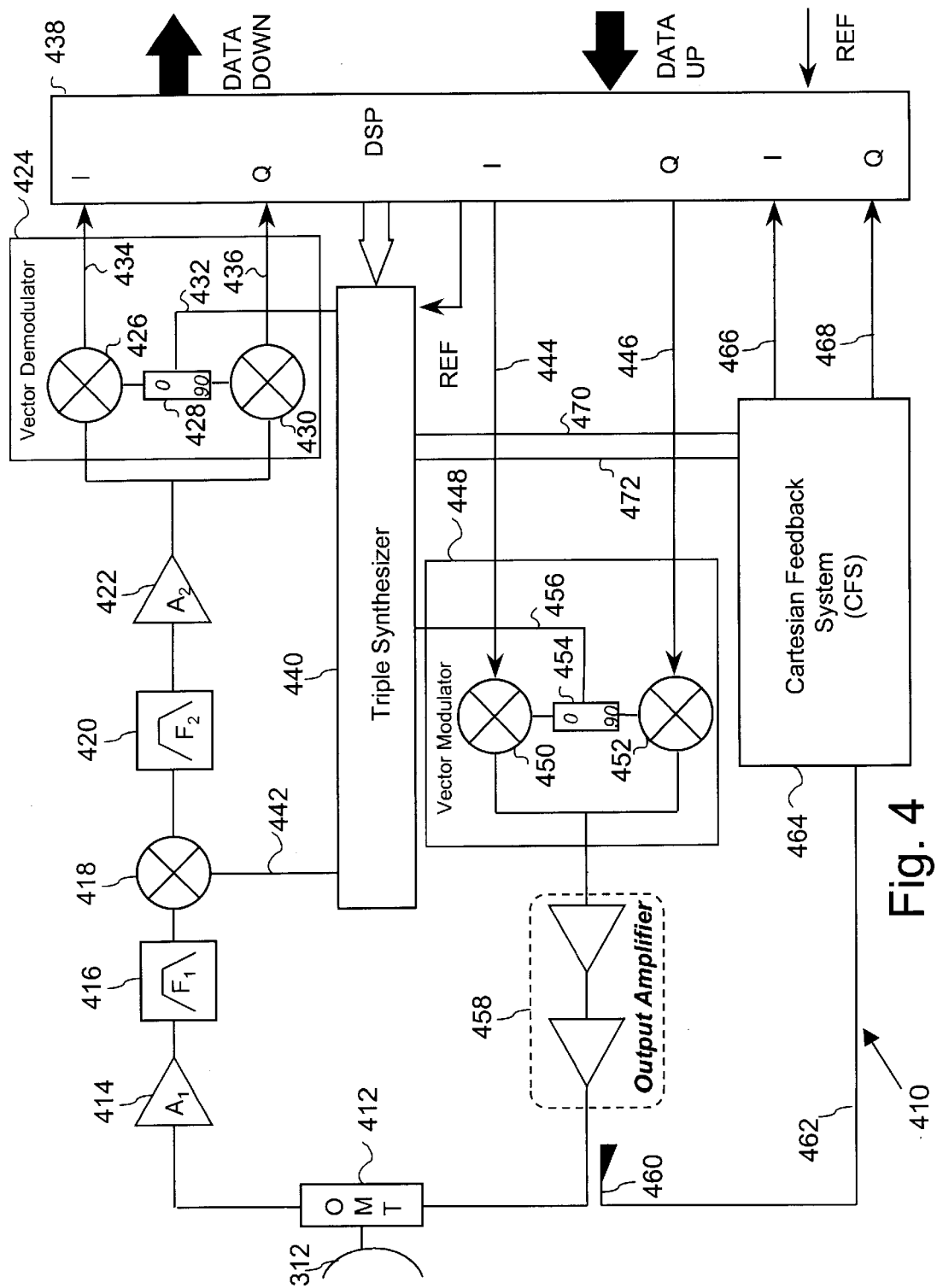
FIG. 4 is a schematic diagram for one embodiment of a transceiver, in accordance with the present invention.

Referring now to FIG. 4, a schematic diagram for one embodiment of a transceiver 410 is shown, in accordance with the present invention. In the preferred embodiment, transceiver 410 is designed to employ an advanced and efficient modulation scheme such as offset quaternary phase shift keying (OQPSK). Furthermore, in the preferred embodiment, transceiver 410 is typically utilized for selected satellite telecommunication applications. However, in other embodiments, transceiver 410 may readily be implemented to perform various other telecommunication applications and functions.

On the receive side, the FIG. 4 transceiver 410 receives incoming receiver data via antenna 312 and then routes the receiver data through amplifier 414 and filter 416 to mixer 418 which heterodynes the receiver data with a signal received from triple synthesizer 440 via line 442 to generate downconverted receiver data. The operation of triple synthesizer 440 is further discussed below in conjunction with FIG. 5.

Transceiver 410 then provides the downconverted receiver data, via filter 420 and amplifier 422, to conventional receiver vector demodulator 424 which demodulates the receiver data to produce receiver I and Q signals. A conventional digital signal processor (DSP) 438 receives and processes the receiver I and Q signals to produce a data down signal which is then provided to user interface 318 (FIG. 3).

On the transmit side, DSP 438 receives a data up signal from user interface 318. DSP 438 responsively processes the data up signal to generate an I demand signal and a Q demand signal. A conventional vector modulator 448 receives the I demand signal on line 444, and also receives the Q demand signal on line 446. Triple synthesizer 440 provides a transmit oscillator signal on line 456 to phase shifter 454, and also provides a doubled receiver oscillator signal to Cartesian feedback system (CFS) 464 via line 470. A mixer 450 combines the I demand signal from line 444 and the in-phase doubled receiver oscillator signal from phase shifter 454. Similarly, a mixer 452 combines the Q demand signal from line 446 and the 90-degrees-out-of-phase doubled receiver oscillator signal from phase shifter 454.

The output signal from mixer 450 is combined with the output signal from mixer 452 to generate a modulated signal (from vector modulator 448) that is then provided to output power amplifier 458 for transmission. Vector modulator 448 thus receives the I demand signal and the Q demand signal (voltages in quadrature that are 90 degrees out-of-phase) and a doubled receiver oscillator signal to generate a single modulated output signal that has a relative phase position that is controlled by the I demand and Q demand signals.

Output power transmitter 458 amplifies the vector demodulator output signal to produce a transmit signal that is provided to antenna 312 for broadcast. As discussed above, for successful operation of transceiver 410, output amplifier 458 must operate in a highly linear manner. In the preferred embodiment, output amplifier 458 is economically implemented as a moderately linear field effect transistor (FET) to achieve an acceptable level of cost-effectiveness. The transmit signal generated by output amplifier 458 may therefore not be exactly what was demanded by the I demand signal and the Q demand signal from DSP 438.

To correct for any distortion or error created by nonlinearity in output amplifier 458, an attenuator 460 samples and attenuates the transmit signal generated by output amplifier 458 to produce an error signal. Attenuator 460 then provides the error signal to Cartesian feedback system (CFS) 464 via line 462. The operation of CFS 464 is further discussed below in conjunction with FIG. 6. Essentially, CFS 464 generates an I result signal and a Q result signal that contain error information corresponding to the distortion in the transmit signal that was sampled from output amplifier 458.

DSP 438 receives the I result signal on line 466 and receives the Q result signal on line 468. DSP 438 may then process the I result signal and the Q result signal to determine the distortion or error on the sampled transmit signal. For example, in one embodiment, DSP 438 may subtract the I result signal from the I demand signal to determine an I error value. Further, DSP 438 may also subtract the Q result signal from the Q demand signal to determine a Q error value.

DSP 438 may then use the I error value as negative feedback to alter (pre-condition) the I demand signal to compensate for any distortion or nonlinearity of output amplifier 458. Similarly, DSP 438 may use the Q error value as negative feedback to alter (pre-condition) the Q demand signal to compensate for any distortion or nonlinearity of output amplifier 458. The path from attenuator 460 through CFS 464 to DSP 438 thus functions as an effective feedback path to improve the efficient operation of transceiver 410.

Figure 5:
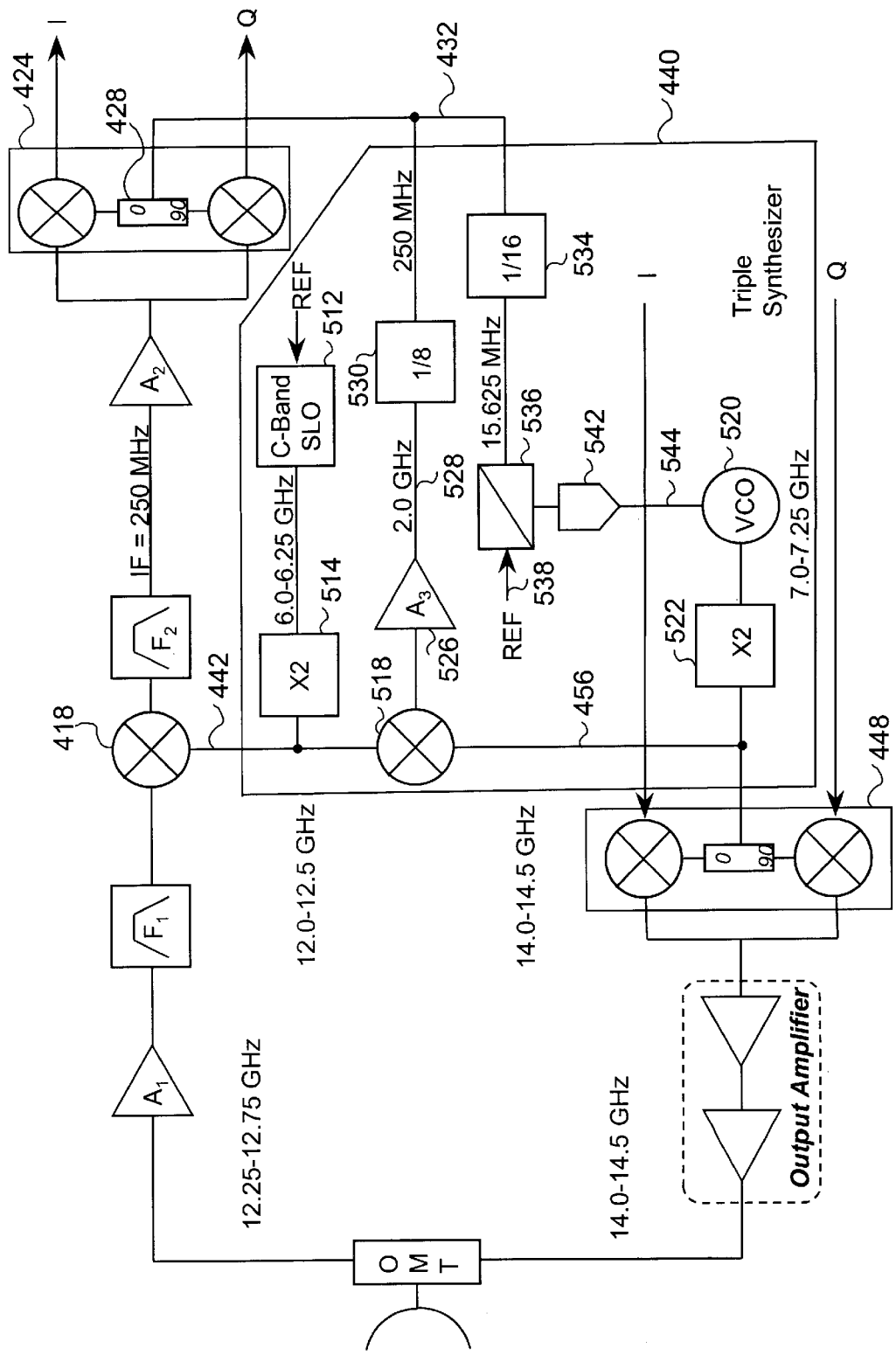
FIG. 5 is a schematic diagram for one embodiment of the triple synthesizer of FIG. 4.

Referring now to FIG. 5, a schematic diagram for one embodiment of the triple synthesizer 440 of FIG. 4 is shown. FIG. 5 shows triple synthesizer 440 and various other elements of transceiver 410, however, for reasons of clarity, Cartesian feedback system (CFS) 464 is omitted from the FIG. 5 diagram.

In the FIG. 5 embodiment, a receiver oscillator (C-Band SLO) 512 receives a reference signal (REF) to generate a receiver oscillator signal (preferably from 6.0 to 6.25 gigahertz). Doubler 514 receives the receiver oscillator signal and responsively generates a doubled receiver oscillator signal (preferably from 12.0 to 12.5 gigahertz) on line 442. The doubled receiver oscillator signal is advantageously provided to Cartesian feedback system 464 (not shown) as further discussed below in conjunction with FIG. 6.

The doubled receiver oscillator signal from doubler 514 is also provided to receiver synthesizer mixer 518 via line 442 for receiver downconvertion, as discussed above in conjunction with FIG. 4. In addition, the doubled receiver oscillator signal from doubler 514 is also provided to mixer 518 via line 442.

Simultaneously, transmitter oscillator (VCO) 520 generates a transmitter oscillator signal (preferably from 7.0 to 7.25 gigahertz), and then provides the transmitter oscillator signal to doubler 522 which responsively generates a doubled transmitter oscillator signal to synthesizer mixer 518. The doubled transmitter oscillator signal is also provided to phase shifter 454 in vector demodulator 448.

Synthesizer mixer 518 generates a synthesizer mixer output signal (preferably 2 gigahertz) through amplifier 526 to divider 530 which preferably generates a divided synthesizer output signal of 250 megahertz. The divided synthesizer output signal is provided to phase shifter 428 in receiver vector demodulator 424. The divided synthesizer output signal is also provided to divider 534 which preferably generates a subdivided synthesizer output signal of 15.625 megahertz.

The subdivided synthesizer output signal from divider 534 is then compared to reference signal (REF) 538 by a comparator in phase-locked loop 536. Phase-locked loop 536 then generates a transmitter oscillator control signal through filter 542 and line 544 to control transmitter oscillator 520. The output frequency of transmitter oscillator 520 thus advantageously tracks the frequency of receiver oscillator 512.

Figure 6:
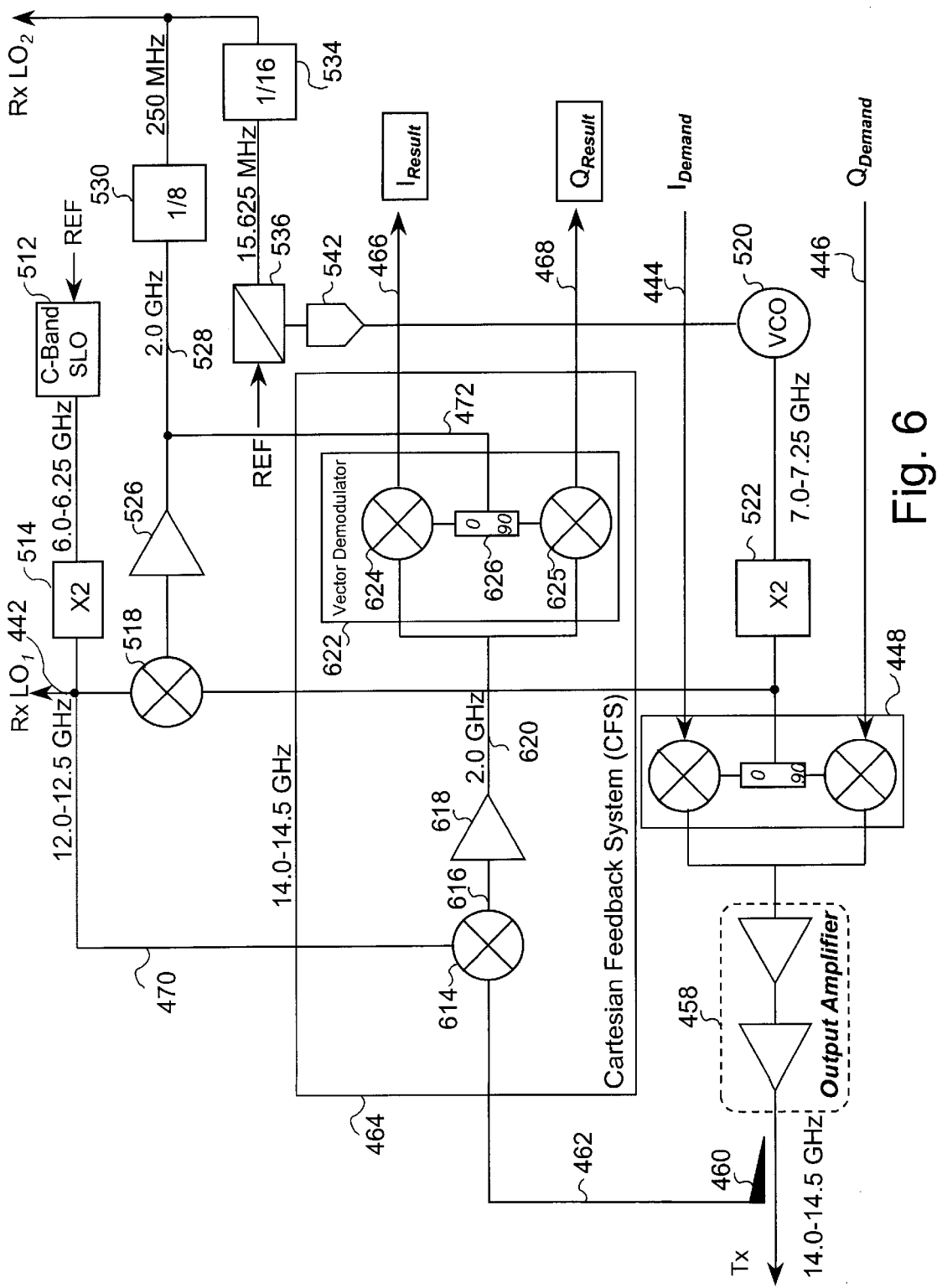
FIG. 6 is a schematic diagram for one embodiment of the Cartesian feedback system of FIG. 4.

Referring now to FIG. 6, a schematic diagram for one embodiment of the Cartesian feedback system (CTS) 464 of FIG. 4 is shown. In the FIG. 6 embodiment, attenuator 460 initially samples and attenuates the transmit signal generated by output amplifier 458 to produce an error signal (preferably from 14.0 to 14.5 gigahertz) that is provided to feedback mixer 614 via line 462. Feedback mixer 614 also receives the doubled receiver oscillator signal (preferably from 12.0 to 12.5 gigahertz) from doubler 514 of triple synthesizer 440 via line 470. Feedback mixer 614 then advantageously heterodynes the doubled receiver oscillator signal and the error signal to generate a downconverted error signal (preferably at 2.0 gigahertz) through amplifier 618 into conventional feedback vector demodulator 622 via line 620.

In practice, downconverting the error signal by feedback mixer 614 (to provide the downconverted error signal to feedback vector demodulator 622) is a significant step in implementing Cartesian feedback system 464. The degree of difficulty in manufacturing electronic components is typically greater for those components that are designed to operate at higher frequencies. For example, exactly matching the operating characteristics of transmitter vector modulator 448 and feedback vector demodulator 622 becomes problematic in the transmission frequency range of transceiver 410. Operating feedback vector demodulator 622 at the unconverted error signal frequency (from 14.0 to 14.5 gigahertz) would therefore potentially introduce additional distortion or error onto the I result signal and the Q result signal. Downconverting the sampled and attenuated error signal with feedback mixer 614 thus permits feedback vector demodulator 622 to function more reliably at the lower downconverted error signal frequency (2.0 gigahertz).

In the FIG. 6 embodiment, feedback vector demodulator 622 then provides the downconverted error signal received on line 620 both to mixer 624 and to mixer 625. Phase shifter 626 receives the synthesizer mixer 518 output signal (preferably at 2.0 gigahertz) from amplifier 526 of triple synthesizer 440 via line 472. Mixer 624 then combines the downconverted error signal with an in-phase synthesizer mixer output signal received from phase shifter 626 to generate an I result signal to DSP 438 via line 466. Similarly, mixer 625 combines the downconverted error signal with a 90 degrees out-of-phase synthesizer mixer output signal received from phase shifter 626 to generate a Q result signal to DSP 438 via line 468.

As discussed above in conjunction with FIG. 4, the I result signal and the Q result signal contain error information corresponding to distortion in the transmit signal sampled from output amplifier 458. To compensate for the distortion, DSP 438 then preferably analyzes the I result signal and the Q result signal to determine the error present in the sampled transmit signal. DSP 438 may then use negative feedback techniques to alter (pre-condition) the I demand signal and the Q demand signal to compensate for any distortion or nonlinearity in output amplifier 458. The path from attenuator 460 through Cartesian feedback system 464 to DSP 438 thus functions as an effective feedback loop to improve the efficient operation of transceiver 410.

Figure 7:
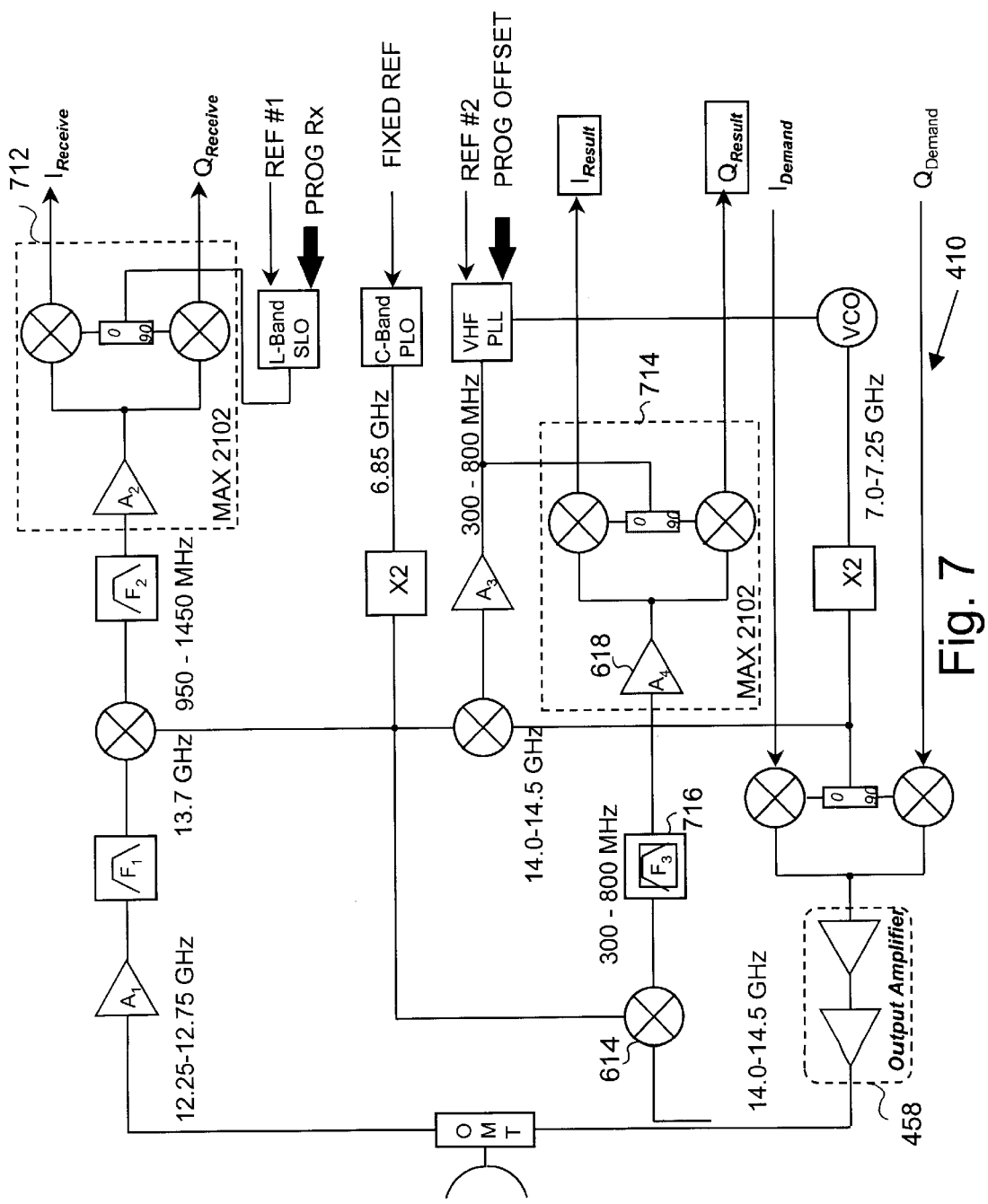
FIG. 7 is a schematic diagram for an alternate embodiment of the satellite transceiver of FIG. 4, in accordance with the present invention.

Referring now to FIG. 7, a schematic diagram for an alternate embodiment of the satellite transceiver 410 is shown, in accordance with the present invention. FIG. 7 includes a receiver vector demodulator integrated circuit 712 and a feedback vector demodulator integrated circuit 714. Receiver vector demodulator integrated circuit 712 is a low-cost electronic component that may economically be used to implement transceiver 410 instead of the receiver vector demodulator 424 of FIG. 4. Similarly, feedback vector demodulator integrated circuit 714 is a low-cost electronic component that may economically be used to implement transceiver 410 instead of the feedback vector demodulator 622 of FIG. 6.

Figure 8:
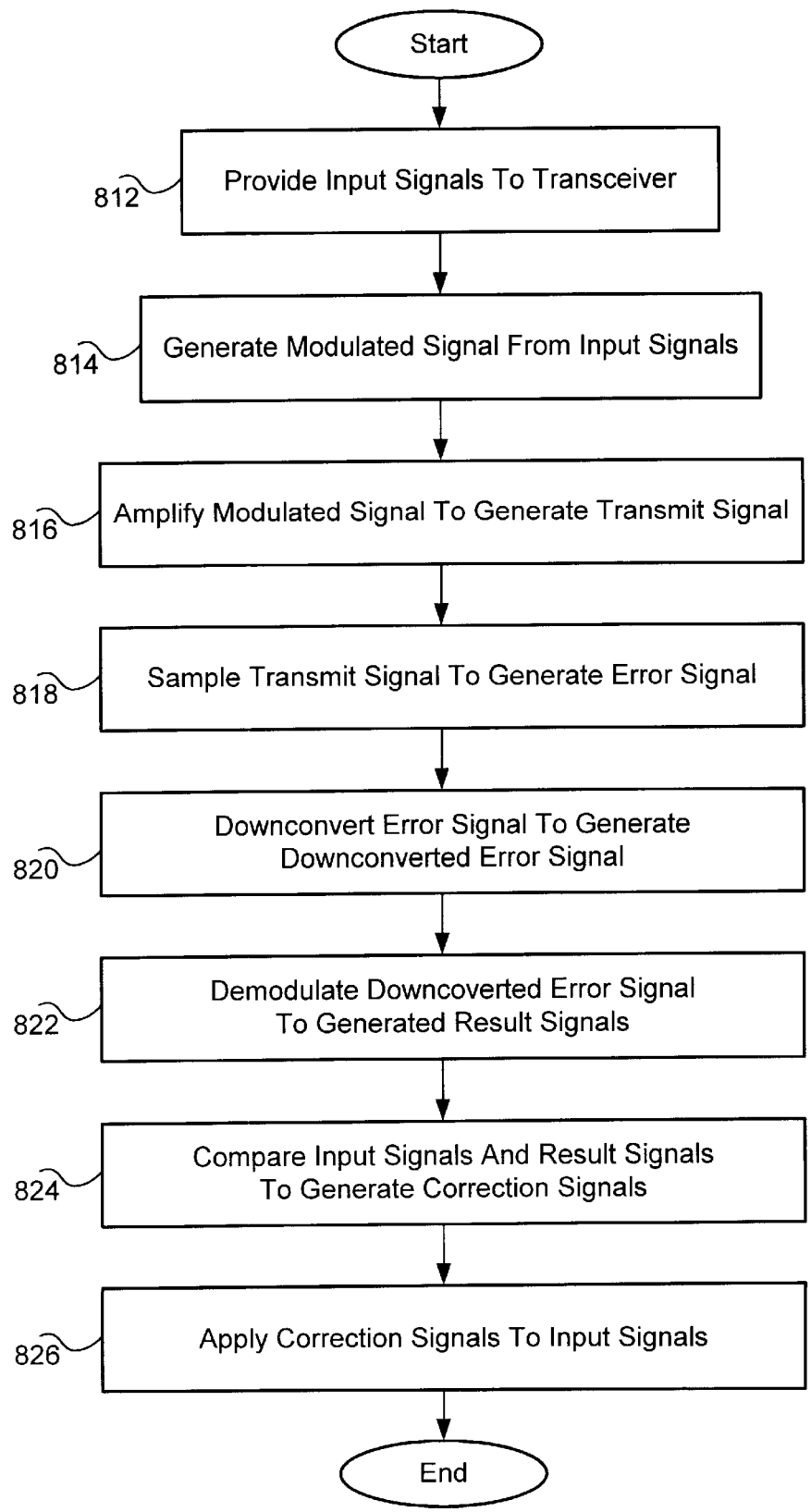
FIG. 8 is a flowchart of preferred method steps for efficiently implementing a satellite transceiver system, in accordance with the present invention.

Referring now to FIG. 8, a flowchart of preferred method steps for efficiently implementing a satellite transceiver system is shown, in accordance with the present invention. Initially, in step 812, a digital signal processor (DSP) 438 provides input signals to transceiver 410. In the preferred embodiment, the input signals include an I demand signal and a Q demand signal for an advanced modulation scheme such as offset quaternary phase shift keying (OQPSK).

Then, in step 814, a vector modulator 448 responsively generates a modulated signal from the received I demand signal and Q demand signal. Next, in step 816, an output amplifier 458 receives and amplifies the modulated signal to generate a transmit signal that is then broadcast by antenna 312.

In step 818, to correct for distortion in the transmit signal (created by various factors such as nonlinearity in output amplifier 458), an attenuator 460 samples and attenuates the transmit signal to generate an error signal. Then, in step 820, a feedback mixer 614 receives and downconverts the error signal to produce a downconverted error signal.

Next, in step 822, a feedback vector demodulator 622 demodulates the downconverted error signal to generate result signals. In the preferred embodiment, the result signals include an I result signal and a Q result signal that contain error information from the transmit signal sampled from output amplifier 458.

In step 824, a DSP 438 compares the input signals (I demand and Q demand) and the result signals (I result and Q result) to generate correction signals. Finally, in step 826, DSP 438 applies the generated correction signals to the input signals (I demand and Q demand) to alter and precondition the input signals, and to thereby compensate for distortion in the transmit signal from output amplifier 458.

The invention has been explained above with reference to a preferred embodiment. Other embodiments will be apparent to those skilled in the art in light of this disclosure. For example, the present invention may readily be implemented using configurations and frequencies other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for implementing a transceiver, comprising:
    a triple synthesizer for generating a doubled receiver oscillator signal and providing the doubled receiver oscillator signal to a downconverter mixer in a receiver coupled to said transceiver;
    a transmitter coupled to said transceiver to generate a transmit signal that includes distortion information;
    a feedback circuit coupled to said transceiver to sample said transmit signal and responsively generate an error signal, said feedback circuit including an attenuator to sample and attenuate said transmit signal to produce an initial error signal, and a feedback mixer configured to downconvert said initial error signal to produce a downconverted error signal; and
    a processor coupled to said transceiver to analyze said error signal and responsively manipulate said transmit signal.

2. The system of claim 1 wherein said feedback mixer generates said downconverted error signal by heterodyning said error signal and said doubled receiver oscillator signal.

3. A system for implementing a transceiver, comprising:
    a transmitter coupled to said transceiver to generate a transmit signal that includes distortion information;
    a feedback circuit coupled to said transceiver to sample said transmit signal and responsively generate an error signal, said feedback circuit including an attenuator to sample and attenuate said transmit signal to produce an initial error signal, a feedback mixer configured to downconvert said error signal to produce a downconverted error signal, and a feedback vector demodulator configured to receive said downconverted error signal and responsively generate result signals; and
    a processor coupled to said transceiver to analyze said error signal and responsively manipulate said transmit signal.

4. The system of claim 3 wherein said result signals include an I result signal and a Q result signal.

5. The system of claim 3 wherein said result signals contain said distortion information from said transmit signals.

6. The system of claim 5 wherein said processor compares said input signals and said result signals to obtain correction signals.

7. The system of claim 6 wherein said processor applies said correction signals to said input signals to compensate for said distortion information.

8. A method for implementing a transceiver, comprising the steps of:
    generating a doubled receiver oscillator signal with a triple synthesizer and providing the doubled receiver oscillator signal to a downconverter mixer in a receiver coupled to said transceiver;
    generating a transmit signal with a transmitter, said transmit signal including distortion information;
    sampling said transmit signal with a feedback circuit to responsively generate an error signal, said feedback circuit including an attenuator to sample and attenuate said transmit signal to produce an initial error signal, and a feedback mixer configured to downconvert said error signal to produce a downconverted error signal; and
    analyzing said error signal with a processor to responsively manipulate said transmit signal.

9. The method of claim 8 wherein said feedback mixer generates said downconverted error signal by heterodyning said error signal and said doubled receiver oscillator signal.

10. A method for implementing a transceiver, comprising the steps of:

generating a transmit signal with a transmitter, said transmit signal including distortion information;

sampling said transmit signal with a feedback circuit to responsively generate an error signal, said feedback circuit including an attenuator to sample and attenuate said transmit signal to produce an initial error signal, a feedback mixer configured to downconvert said error signal to produce a downconverted error signal, and a feedback vector demodulator configured to receive said downconverted error signal and responsively generate result signals; and analyzing said error signal with a processor to responsively manipulate said transmit signal.

11. The method of claim 10 wherein said result signals include an I result signal and a Q result signal.

12. The method of claim 10 wherein said result signals contain said distortion information from said transmit signals.

13. The method of claim 12 wherein said processor compares said input signals and said result signals to obtain correction signals.

14. The method of claim 13 wherein said processor applies said correction signals to said input signals to compensate for said distortion information.

* * * * *